Aug. 30, 1955   M. P. LAUGHLIN   2,716,443
SEAT BACK SUPPORT
Filed May 25, 1954

INVENTOR
Myron P. Laughlin

United States Patent Office 2,716,443
Patented Aug. 30, 1955

2,716,443

SEAT BACK SUPPORT

Myron P. Laughlin, St. Petersburg, Fla.

Application May 25, 1954, Serial No. 432,189

2 Claims. (Cl. 155—182)

This invention relates to back supports for seats, and more particularly to a back support for automobile drivers.

It is the purpose of this invention to provide a supplementary back support which may be applied to the ordinary automobile cushion seat and which will give firm support for the automobile driver, while, at the same time permitting air circulation behind his clothing and between him and the seat cushion.

This inventor is aware that devices for the above purpose have been previously marketed, but these former devices have failed in the full accomplishment of their purposes in that they failed to provide full support for the driver's back and being merely set in place, form no real foundation or secure back support when the driver was called upon to exert his full strength to meet emergencies. Further, such devices were prone to follow the driver out of the car when he was callled upon to leave the seat rapidly, nor did such forms of attachment as were heretofore supplied, such as back straps and under cushion hooks, permit ready attachment or detachment of the seat back which is often the personal property of the driver who may be called on to change cars at any time.

It is thus the primary purpose of this invention to provide a readily demountable, ventilated seat back, which will be low in cost of manufacture and extremely firm in support of the driver's back, while held in place without back straps or hooks.

Certain other purposes and advantages of the herein-disclosed invention will be apparent to those skilled in the art as the appended description progresses and by reference to the attached drawing, wherein—

Figure 1:
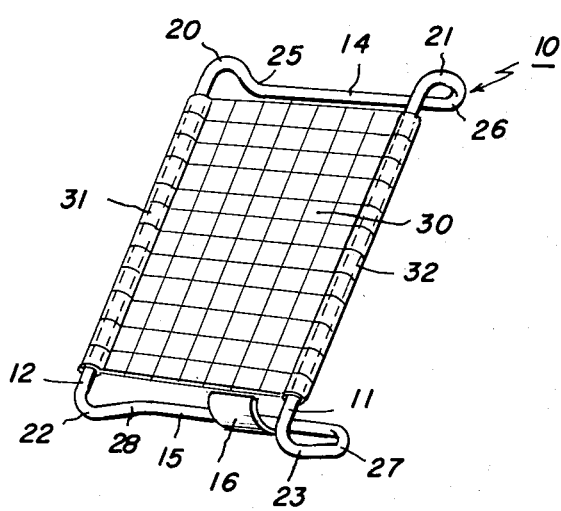
Fig. 1 is an elevation in perspective of one embodiment of my invention.
Figure 2:
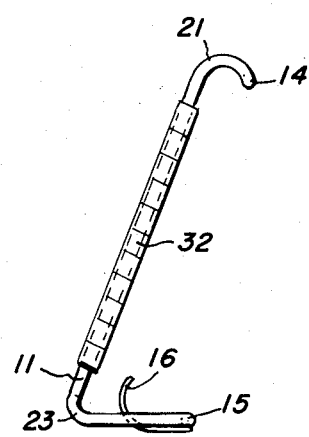
Fig. 2 is a side elevation of the device shown in Fig. 1.

Referring to Figs. 1 and 2, the main frame 10 is preferably bent from a continuous piece of metal to provide side members 11 and 12 spaced and held by end members 14 and 15 joined thereto by curved sections 20, 21, 22, 23 which in turn join into end members 14 and 15 through secondary curved portions 25, 26, 27, 28. Back web 30 may be made of porous cloth and webbing in one piece, or in woven strips and may be secured to side members 11 and 12 by sewed open hems or pockets 31 and 32 so that cloth and fabric heretofore though unusable for such purpose may be employed and a seat back which can truly conform to the user's back be provided.

The primary purpose of the curved sections 20, 21, 22, 23, 25, 26, 27, 28 will now be manifest since through the resilience thus effected the fabric back may be stretched taut, yield enough to adjust to torso of the user while still "hugging" back and shoulders so that the driver user has a firm back and side foundation to thrust against as he exerts his strength in driving.

Figure 3:
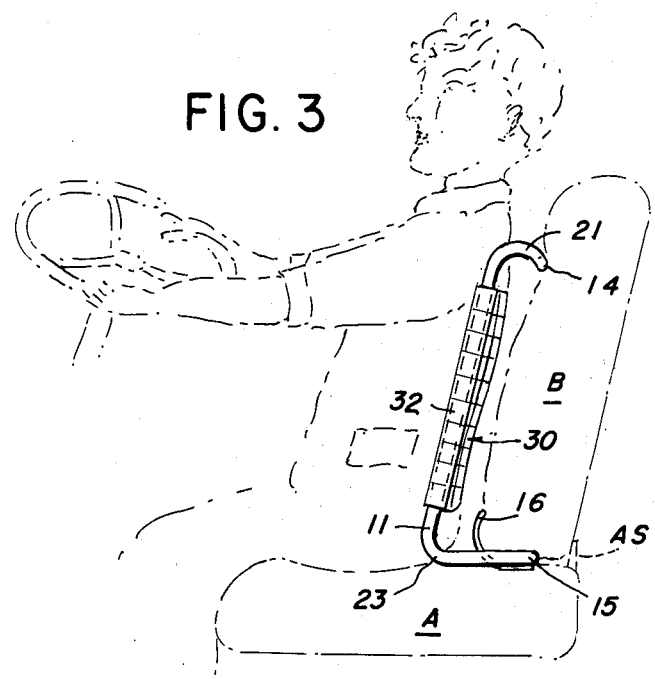
Fig. 3 is a side view of the improved seat rest in use in an automobile.

A further purpose of the curved portions 20, 21, 22, 23 will appear upon reference to Fig. 3 wherein an automobile seat is represented diagrammatically by cushions A and B containing the usual resilient material and springs well known to such arts. Examination of the figure will show that the form of frame 10 permits end member 15 to press upward on the bottom of cushion B under the upward pressure of cushion A on sections 22 and 23 and the leverage of side members 11 and 12 working against end members 14 bearing on the face of cushion B, and sections 22 and 23 on cushion A.

Thus it will be seen that cushions A and B work together to hold the improved back means in place and that the removal of pressure on cushions by the driver leaving his place increases such gripping of the frame by the cushions and effectively prevents the "follow-out" fault so common to previous devices. End section 15 also serves to hold the lower end of members 11 and 12 away from the surface of cushion B projecting backward to cushion stop AS where such is employed and held from further backward movement by a curved forward projection 16 which may replace contact with stop AS, where such is not part of the cushion structure supplied by the automobile manufacturer.

Thus it will be clear that while supports adapted to be placed on automobile seats to aid in accommodating more comfortably the back of the automobile driver and to provide a ventilating space between the driver's body and the seat cushion's unavoidable bulk, are known, the present applicant provides such a support through improved means which eliminate objectionable features of such earlier supports, reduce the cost of such devices and increase their usefulness and availability to the public. Manifestly certain changes in structural embodiment will suggest themselves to those skilled in the art, but it will be apparent that such are well within the spirit of the appended claims.

What I claim is:

1. In an automobile seat back support, a frame having a top cushion bearing member, side fabric support members and a bottom bearing and locking member adapted to enter the gap between back and seat cushions of the automobile to hook upwardly into the lower surface of said back cushion.

2. An automobile seat back support including a top cross frame member adapted to lie upon the automobile seat cushion and to space therefrom two side members which support a fabric therebetween, said side members extending substantially their full length parallel to but removed from the surface of the seat cushion and turning backwardly and upwardly at their lower ends to terminate in a lower cross member bearing upwardly upon the lower edge of the aforesaid cushion so that the said frame is held locked to the aforesaid cushion by driver pressure when in use and by released upward pressure of the automobile seat bottom cushion when unoccupied.

References Cited in the file of this patent

UNITED STATES PATENTS

| 1,163,945 | Murdock | Dec. 14, 1915 |
| 2,119,023 | Pickard | May 31, 1938 |
| 2,260352 | Trapani | Oct. 28, 1941 |
| 2,365,003 | Reinholz | Dec. 12, 1944 |
| 2,547,350 | Veale | Apr. 3, 1951 |
| 2,663,359 | Wood | Dec. 22, 1953 |

FOREIGN PATENTS

| 2,598 | Great Britain | 1899 |